United States Patent
Shim

(10) Patent No.: US 8,803,368 B2
(45) Date of Patent: Aug. 12, 2014

(54) IMAGE FORMING APPARATUS, UNIVERSAL INTERFACE DEVICE, AND METHOD OF USING OPTION UNIT

(75) Inventor: Chang-hyeon Shim, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 653 days.

(21) Appl. No.: 12/607,158

(22) Filed: Oct. 28, 2009

(65) Prior Publication Data

US 2010/0171980 A1 Jul. 8, 2010

(30) Foreign Application Priority Data

Jan. 6, 2009 (KR) .................. 10-2009-0000884

(51) Int. Cl.
*G06F 1/26* (2006.01)

(52) U.S. Cl.
CPC ...................................... *G06F 1/266* (2013.01)
USPC .............................. 307/112; 307/116; 307/125

(58) Field of Classification Search
CPC ....................................................... G06F 1/266
USPC .......................................... 307/112, 116, 125
See application file for complete search history.

(56) References Cited

U.S. PATENT DOCUMENTS

| | | | | |
|---|---|---|---|---|
| 5,428,798 A * | 6/1995 | Sekine et al. | ................. | 713/330 |
| 5,613,130 A * | 3/1997 | Teng et al. | ................. | 713/300 |
| 6,308,240 B1 * | 10/2001 | De Nicolo | ................. | 710/300 |
| 6,986,071 B2 * | 1/2006 | Darshan et al. | ................. | 713/330 |
| 7,203,849 B2 * | 4/2007 | Dove | ................. | 713/300 |
| 7,240,224 B1 * | 7/2007 | Biederman | ................. | 713/300 |
| 7,278,033 B2 * | 10/2007 | Mylly | ................. | 713/300 |
| 7,509,505 B2 * | 3/2009 | Randall et al. | ................. | 713/300 |
| 7,890,776 B2 * | 2/2011 | Diab et al. | ................. | 713/300 |
| 8,300,666 B2 * | 10/2012 | Karam et al. | ................. | 370/496 |
| 8,316,223 B2 * | 11/2012 | Karam et al. | ................. | 713/1 |
| 2006/0082220 A1 * | 4/2006 | Karam et al. | ................. | 307/4 |
| 2007/0110360 A1 * | 5/2007 | Stanford | ................. | 385/14 |
| 2008/0005602 A1 * | 1/2008 | Diab et al. | ................. | 713/300 |
| 2008/0016263 A1 * | 1/2008 | Diab et al. | ................. | 710/105 |
| 2011/0131428 A1 * | 6/2011 | Diab et al. | ................. | 713/300 |
| 2011/0246797 A1 * | 10/2011 | Diab et al. | ................. | 713/300 |

FOREIGN PATENT DOCUMENTS

JP 2006-276796 10/2006

OTHER PUBLICATIONS

Korean Office Action dated Jan. 13, 2014 issued in KR Application No. 10-2009-0000884.

* cited by examiner

*Primary Examiner* — Adi Amrany
(74) *Attorney, Agent, or Firm* — Stanzione & Kim, LLP

(57) ABSTRACT

An image forming apparatus includes a control unit to identify a type of an option unit using pre-stored ID information including information regarding a universal interface to which at least one type of option unit can be connected, a power supply unit, and an option unit connected to the universal interface. A plurality of switches is located along a power supply path between the option unit and the power supply unit. The pre-stored ID information includes the type of the option unit and level of power allowed for the type of option unit. The control unit controls on/off states of the plurality of switches so that power corresponding to the identified type of option unit can be supplied to the option unit. Accordingly, possible damage to the image forming apparatus due to inappropriate connection between the option unit and the image forming apparatus is prevented.

11 Claims, 12 Drawing Sheets

IMAGE FORMING APPARATUS, UNIVERSAL INTERFACE DEVICE, AND METHOD OF USING OPTION UNIT

CROSS-REFERENCE TO RELATED APPLICATIONS

This application claims priority under 35 U.S.C. §119(a) from Korean Patent Application No. 2009-00884, filed on Jan. 6, 2009, in the Korean Intellectual Property Office, the contents of which are incorporated herein by reference in their entirety.

BACKGROUND

1. Field of the Invention

The present general inventive concept relates to an interface device to connect an option unit to a main unit and an interface method thereof. More particularly, the present general inventive concept relates to an image forming apparatus which can be used with multiple types of option units, a universal interface device, and a method of using the option unit.

2. Description of the Related Art

An image forming apparatus may generate, print, receive, and transmit image data. Examples of an image forming apparatus include a printer, a scanner, a copier, a fax machine, and a multi-function printer integrating the above functions.

If the image forming apparatus is defined as a main unit, an apparatus that can be separated from and controlled by the image forming apparatus without affecting the main functions such as printing, scanning, and copying is defined as an option unit. Examples of option units include finishers capable of performing an auto-classification and staple function, double capacity feeders (DCF), and high capacity feeders (HCF).

The conventional option unit has problems in that each type of option unit may have a different interface. Accordingly, when an option unit is connected with a main unit, the main unit must provide different interfaces depending on the type of option unit.

If a user connects a main unit with an option unit which is incompatible with the main unit by mistake, the main unit and the option unit may be damaged or may not function properly.

SUMMARY

To address the above, and other, issues, the present general inventive concept provides an image forming apparatus which can be used regardless of the type of option unit by using the ID of the option unit connected to the main unit, a universal interface device, and a method of using the option unit.

Additional aspects and utilities of the present general inventive concept will be set forth in part in the description which follows and, in part, will be obvious from the description, or may be learned by practice of the general inventive concept.

Features and/or utilities of the present general inventive concept may be realized by an image forming apparatus including a universal interface which can be connected to at least one type of option unit individually, a power supply unit, a plurality of switches located along a power supply path between the option unit and the universal interface and the power supply unit, and a control unit which identifies a type of option unit using pre-stored ID information including information regarding the type of option unit and level of power allowed for the type of option unit, and controls on/off of the plurality of switches so that power corresponding to the identified type of option unit can be supplied to the option unit.

The control unit may read ID information stored in the option unit connected to the universal interface.

The control unit may activate the option unit by controlling the plurality of switches so that maximum power allowed for the option unit can be supplied to the option unit if the option unit is connected to the universal interface.

The control unit may identify the type of the option unit after receiving the ID information from the activated option unit and adjust on/off of the plurality of switches so that power corresponding to the identified type of option unit can be supplied to the option unit.

The universal interface may have multiple interfaces, and if the image forming apparatus is turned on while option units are connected to each of a plurality of universal interfaces, the control unit may control the power supply unit and the plurality of switches so that power is supplied to each of the plurality of universal interfaces respectively.

Additional features and/or utilities of the present general inventive concept may also be realized by a universal interface including a first connection unit which is connected to a main unit, a second connection unit which can be connected to at least one type of option unit, and a plurality of switches located along a power supply path between the first connection unit and the second connection unit. On/off states of the switches may be controlled so that power corresponding to the type of option unit is supplied to the option unit.

The universal interface may further include a control unit to identify a type of the option unit using pre-stored ID information regarding the type of the option unit and a level of power allowed for each type of option unit, and to control on/off states of the plurality of switches so that power corresponding to the type of option unit is supplied to the option unit.

On/off of the plurality of switches may be controlled by the main unit which identifies the type of option unit using ID information of the option unit.

Additional features and/or utilities of the present general inventive concept may also be realized by a method of using an option unit including connecting the option unit, identifying the type of option unit using pre-stored ID information including information regarding the type of option unit and allowed level of power for the type of option unit, and controlling on/off of a plurality of switches located along a power supply path to supply power to the option unit according to the identified type, and supplying power corresponding to the identified power to the option unit.

The option unit may be connected to an image forming apparatus via a universal interface, and the plurality of switches may be located inside the universal interface.

The plurality of switches may be included in the image forming apparatus.

The method of using an option unit may further include activating the option unit by controlling the plurality of switches to supply maximum power allowed for the option unit to the option unit if the option unit is connected and receiving ID information from the activated option unit.

The method of using an option unit may further include reading ID information stored in the connected option unit.

Additional features and/or utilities of the present general inventive concept may also be realized by an imaging system including an imaging apparatus, a universal interface module connected to the imaging apparatus and connectable to a plurality of types of option units, and an option unit of a first type connected to the universal interface to perform a function different than the imaging function of the imaging apparatus.

The imaging apparatus may be a multi-function imaging apparatus capable of performing print, scan, and copy functions.

The imaging apparatus may include a plurality of switches to control a power level output to the option unit.

The imaging apparatus may include a controller to control the on/off states of the switches.

The controller may obtain identification information from the option unit to identify at least one of a type of the connected option unit and a power level to be supplied to the connected option unit, and the controller may control the on/off states of the plurality of switches according to the obtained identification information.

The option unit may include a data storage device, and the controller may obtain the identification information from the data storage device.

The universal interface module may include a plurality of switches to control a power level output to the option unit. The universal interface module may include a controller to control the on/off states of the switches.

The controller may obtain identification information from the option unit to identify at least one of a type of the connected option unit and a power level to be supplied to the connected option unit, and the controller may control the on/off states of the plurality of switches according to the obtained identification information.

The imaging apparatus may include a controller to obtain identification information from the option unit to identify at least one of a type of the connected option unit and a power level to be supplied to the connected option unit and to control the on/off states of the plurality of switches in the universal interface module according to the obtained identification information.

The universal interface module may include a plurality of universal interfaces, each capable of being simultaneously connected to a different option unit. Each of the plurality of universal interfaces may be identical.

At least a first universal interface of the plurality of universal interfaces may be different from a second universal interface of the plurality of universal interfaces, and the first universal interface may connect to an option unit of a different type than the second universal interface.

The universal interface module may include a first physical object transmission port, a first electrical signal port, and a first mechanical connector to connect to the imaging apparatus, and a second physical object transmission port, a second electrical signal port, and a second mechanical connector to connect to the option unit.

The imaging apparatus may be a document imaging apparatus, and the option unit may be one of a finisher capable of performing auto-classification and staple function of a document, a double capacity feeder, and a high capacity feeder.

The option unit may include a power protection unit to protect the option unit from high power levels received from the universal interface module.

Additional features and/or utilities of the present general inventive concept may also be realized by a universal interface module to connect an imaging apparatus to a plurality of types of option units. The universal interface module may include a first side to connect to an imaging apparatus and a second side to connect to a plurality of types of option units.

The first side may include a first physical object transmission port and a first electrical signal port to receive a physical object and electrical signals, respectively, from the imaging apparatus, and the second side may include a second physical object transmission port and a second electrical signal port to transmit a physical object and electrical signals, respectively, to an option unit.

The first and second electrical signal ports may include at least first and second power ports. The universal interface module may further include a plurality of switches located between the first and second power ports, the plurality of switches to supply power to an option unit connected to the universal interface module.

The universal interface module may further include a controller to receive identification information from the option unit connected to the universal interface module and to control on/off states of the plurality of switches according to the received identification information.

The universal interface module may further include a protective circuit between the first and second power ports to protect a connected option unit from at least one of excessive power, voltage, and current.

Each of the first and second electrical signal ports may include at least one data transmission port.

The second side may include only one universal interface and the one universal interface may be capable of connecting to a plurality of types of option units.

The second side may include a plurality of universal interfaces, each universal interface to connect to at least one type of option unit, and at least a first universal interface of the plurality of universal interfaces may be capable of being connected to a first option unit at the same time that a second universal interface is connected to a second option unit.

The first side may include a single connection interface to connect to the imaging apparatus.

Each universal interface may be capable of connecting to only one type of option unit, and each universal interface may correspond to a different type of option unit.

Each universal interface may be capable of connecting to a plurality of types of option units, and each universal interface may be identical to each other universal interface.

Additional features and/or utilities of the present general inventive concept may also be realized by a method to connect an option unit to an imaging apparatus. The method may include connecting a universal interface module to an imaging apparatus, the universal interface module configured to receive an option unit of a plurality of types of option units and connecting a first option unit to a first universal interface of the universal interface module to connect the first option unit to the imaging apparatus.

The method may further include removing the first option unit from the universal interface module and connecting a second option unit of a different type to the first universal interface of the universal interface module.

The method may further include connecting a second option unit to a second universal interface of the universal interface module while the first option unit is connected to the first universal interface.

The first option unit may be of a different type than the second option unit.

The method may further include receiving identification information from the first option unit, the identification information including at least one of information regarding a type of the first option unit and power level information to operate the first option unit.

Receiving identification information may include outputting a maximum power level to the first option unit to activate the first option unit, and receiving identification information upon activation.

The identification information may include information regarding a function of the first option unit, and the method may further include performing the function of the first option unit after receiving the information regarding the function.

The method may also include adjusting a power level output to the first option unit to correspond to the identification information received from the first option unit.

At least one of the imaging apparatus and the universal interface module may include a plurality of switches along a power line between a power supply of the imaging apparatus and the first option unit, and adjusting the power level may include adjusting on/off states of the plurality of switches.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
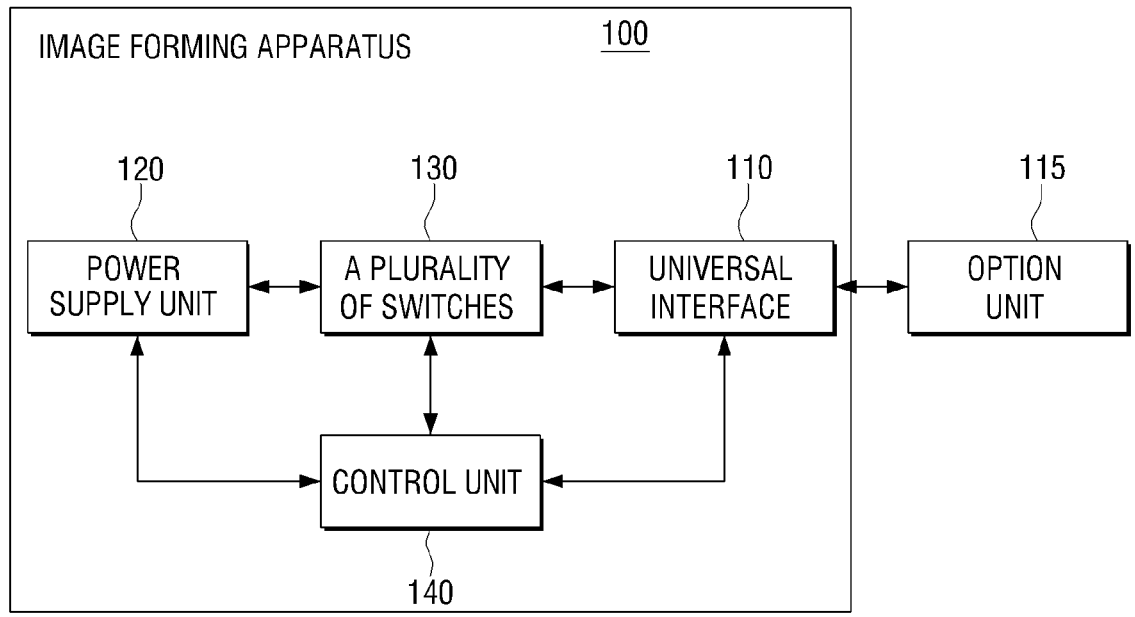
FIG. 1 is a schematic view illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a schematic view illustrating an image forming apparatus 100 according to an exemplary embodiment of the present general inventive concept. The image forming apparatus 100 comprises a universal interface 110, a power supply unit 120, a plurality of switches 130, and a control unit 140.

The image forming apparatus 100 may be a multi-function printer, for example, and one or more option units 115 may be connected to the image forming apparatus. In this case, the image forming apparatus 100 may be referred to as a main unit.

The option unit 115 may be a finisher capable of performing auto-classification and staple function, a double capacity feeder (DCF) which is a printing paper cartridge, or a high capacity feeder (HCF), for example.

The universal interface 110 may be connected to one or more types of option units 115. The universal interface 110 may provide a common interface to various types of option units 115. For instance, an option unit A may be connected to the universal interface 110, and an option unit B may also be connected to the universal interface 110 after the option unit A is removed.

There may be a plurality of the universal interfaces 110, and the plurality of the universal interfaces may each have a common interface. Accordingly, the option unit A does not have to be removed when the option unit B is connected.

The power supply unit 120 may provide power to operate the image forming apparatus 100 and an option unit 115 connected to the image forming apparatus 100. The power may include electric current and voltage.

The plurality of switches 130 may be located along a power supply path between the option unit 115 connected to the universal interface unit 110 and the power supply unit 120.

The control unit 140 may identify the type of option unit 115 using pre-stored ID information regarding the type of option unit 115 and power supply allowed for each type of the option unit 115, and may control on/off states of a plurality of switches so that a level of power corresponding to the identified type of option unit 115 can be provided to the option unit 115.

The ID information regarding an option unit 115 may be pre-stored in a data storage unit (not shown) in the option unit 115. That is, if an option unit 115 is connected to the image forming apparatus 100 via the universal interface 110, the control unit 140 of the image forming apparatus may check information regarding the type of the option unit 115 and power supply allowed for each type of the option unit 115 using the ID information pre-stored in the storage unit (not shown) of the option unit 115.

Since the image forming apparatus 100 uses the ID information of an option unit 115, there is no need for a separate circuit structure to check current and voltage required for the option unit 115, and thus the circuit structure within the image forming apparatus 100 may be simplified.

The information regarding power allowed for the option unit 115 may include information on maximum current allowed for an option unit 115, current required for an option unit 115, maximum voltage allowed for an option unit 115, and voltage required for an option unit 115.

The ID information stored in an option unit 115 may include information on the type of option unit 115, maximum current allowed for an option unit 115, current required for an option unit 115, maximum voltage allowed for an option unit 115, and a voltage required for an option unit 115. The type of option unit 115 may be classified by allocating "00" to a DCF, "01" to a HCF, and "11" to a finisher, for example. The type of option unit 115 may also be classified using general serial numbers.

Since an option unit 115 may be connected to the image forming apparatus 100 to complement various functions of the image forming apparatus 100, a manufacturer of the option unit 115 is usually the same as that of the image forming apparatus 100. Accordingly, if the image forming apparatus is connected to the option unit 115, the image forming apparatus 100 may check information regarding the option unit 115 via ID information of the option unit 115.

The control unit 140 may read the ID information stored in the option unit 115 which is connected to the universal interface 110. That is, as long as the option unit 115 is connected to the universal interface 110, the control unit 140 may check all the information regarding the option unit 115 including the type of option unit 115 by reading out the ID information stored in a memory (not shown) included in the option unit 115. The control unit 140 may still read out the ID information even when power is not supplied to the option unit 115.

If an option unit 115 is connected to the universal interface 110, the control unit 140 may activate the option unit 115 by controlling a plurality of switches so that a maximum power is supplied to the option unit 115. Since the type of option unit 115 connected to the image forming apparatus 100 would not yet be known, the control unit 140 may activate the option unit 115 by turning on all of the plurality of switches 130 and providing maximum power to the option unit 115.

The control unit 140 may receive the ID information from the activated option unit 115 to identify the type of option unit 115, and may adjust on/off states of the plurality of switches so that power corresponding to the identified type of option unit 115 can be supplied.

The above configuration and process can avoid damaging the image forming apparatus 100 due to inappropriate connection between the option unit 115 and the image forming apparatus 100. Furthermore, the option unit 115 may be connected to the universal interface 110 regardless of the type of option unit 115, and thus user convenience may be enhanced.

Figure 2:
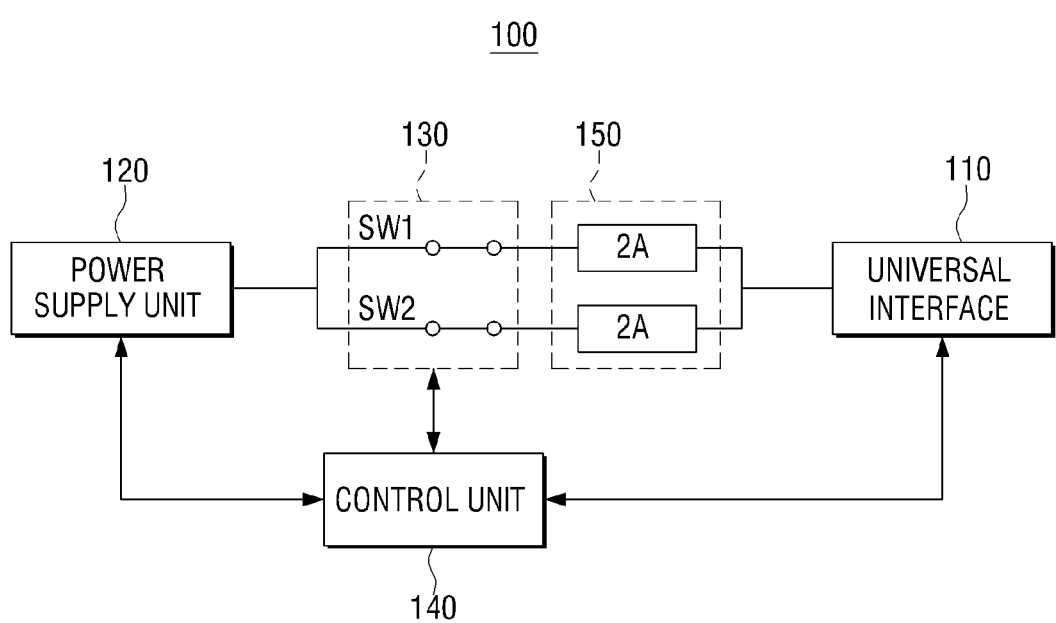
FIG. 2 is a schematic view illustrating operation principal of the image forming apparatus in FIG. 1.

FIG. 2 is a schematic view illustrating operation of the image forming apparatus in FIG. 1. The image forming apparatus 100 may include a protective circuit unit 150 connected to the plurality of switches 130.

FIG. 2 illustrates that if a certain option unit 115 is connected to the universal interface 110, the control unit 140 may control the plurality of switches 130 to apply current (or voltage) required for the option unit 115 to the option unit 115 using the ID information of the option unit 115. For instance, if the option unit 115 connected to the universal interface 110 can consume the current of 2 amps (A), the current can be supplied by turning on one of the two switches SW1, SW2. Although two switches are illustrated in FIG. 2, additional switches may be used.

The image forming apparatus 100 may include a plurality of fuses, and may further include the protective circuit unit 150, including fuses, current sinks, or other circuitry to prevent over-current or over-voltage from being supplied.

Figure 3:
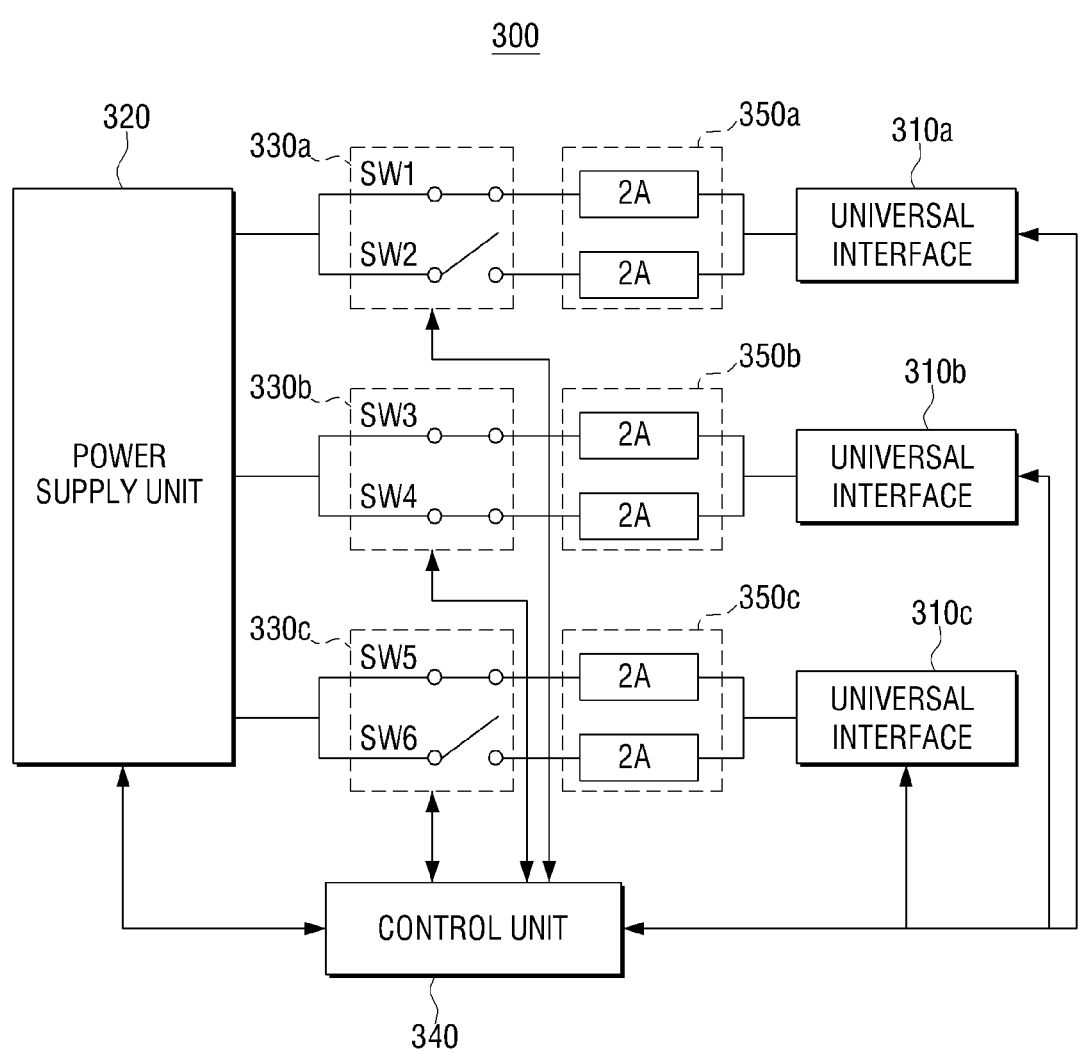
FIG. 3 is a schematic view illustrating an image forming apparatus according to another exemplary embodiment of the present general inventive concept.

FIG. 3 is a schematic view illustrating an image forming apparatus according to another exemplary embodiment of the present general inventive concept. The image forming apparatus 300 may include a plurality of universal interface 310a, 310b, 310c, and a different option unit 115 may be connected to each of the plurality of universal interface 310a, 310b, 310c.

If the image forming apparatus 300 is turned on while an option unit 115 is connected to the each of the plurality of universal interface 310a, 310b, 310c, the control unit 340 may control the power supply unit 320 and the plurality of switches 330a, 330b, 330c so that power is supplied to the plurality of switches 330a, 330b, 330c, respectively.

FIG. 3 illustrates that if an option unit A is connected to the universal interface 310a, and the option unit A requires the current of 2 A, the control unit 340 may control the plurality of switches so that only SW1 of the two switches is turned on.

If an option unit B is connected to the universal interface 310b, and the option unit B requires the current of 4 A, the control unit 340 may control the plurality of switches so that both of the two switches SW3, SW4 are turned on. If an option unit C is applied to the universal interface 310c, the same process is applied.

If a different option unit 115 is connected via the plurality of universal interfaces 310a, 310b, 310c, the image forming apparatus 300 distributes power required for each option unit 115 appropriately, so that power supplied to each option unit 115 from the power supply unit 320 of the image forming apparatus 300 can be efficiently used.

Figure 4:
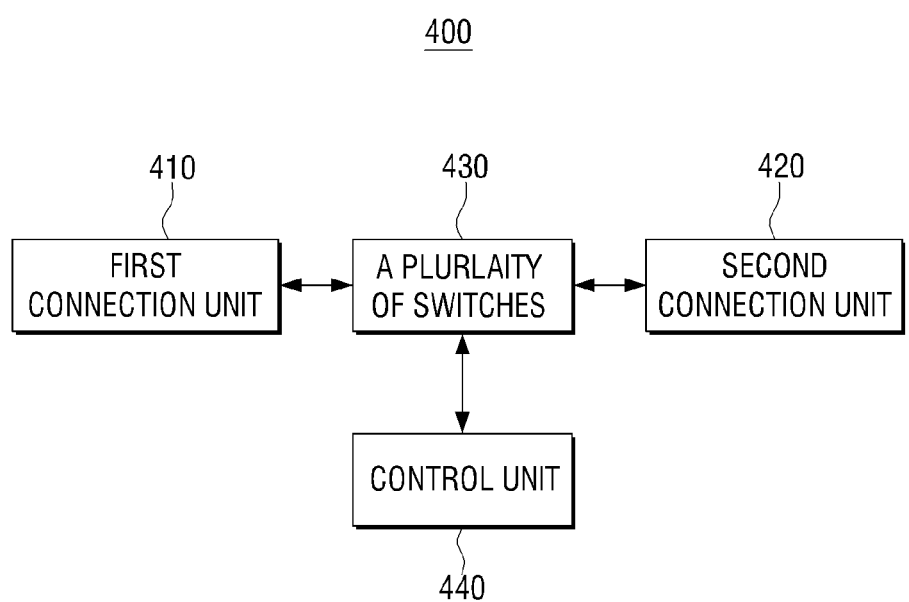
FIG. 4 is a schematic view illustrating a universal interface according to an exemplary embodiment of the present general inventive concept.

FIG. 4 is a block diagram illustrating a universal interface according to an embodiment of the present general inventive concept. The universal interface 400 may include a first connection unit 410, a second connection unit 420, a plurality of switches 430, and a control unit 440.

The first connection unit 410 may be connected to a main unit. The second connection unit 420 may be connected to at least one type of option unit 115. The first connection unit 410 and the second connection unit 420 may be implemented in the form of a connector.

The plurality of switches 430 may be located along a power supply path between the first connection unit 410 and the second connection unit 420, and on/off states of the plurality of switches 430 may be controlled so that a power level corresponding to the type of option unit 115 may be supplied to the option unit 115.

The universal interface 400 may be a small-scale apparatus, and the control unit which is located in a main unit outside the universal interface 400 via the first connection unit 410 may control the plurality of switches 430.

The universal interface 400 may further include the control unit 440 in addition to the first connection unit 410, the second connection unit 420, and the plurality of switches 430. In this case, the control unit 440 may identify the type of option unit 115 using the pre-stored ID information regarding the type of option unit 115 and power allowed for each type of option unit 115, and control on/off states of the plurality of switches so that power corresponding to the identified type of option unit 115 can be supplied.

On/off states of the plurality of switches 430 may be controlled by the main unit which identifies the type of option unit 115 using the ID information of option unit 115. The method of controlling the plurality of switches 430 using the ID information of option unit 115 is similar to that discussed above with respect to the image forming apparatuses 100, 300.

In FIG. 1-FIG. 3, the function of the universal interface 400 is included in the image forming apparatus 100, 300, but in FIG. 4, the universal interface 400 may be provided as a separate component from the image forming apparatus 100, 300.

In addition, in FIG. 1-FIG. 3, the image forming apparatus 100, 300 may have a plurality of universal interfaces, but in FIG. 4, only the universal interface 400 is provided.

Figure 5:
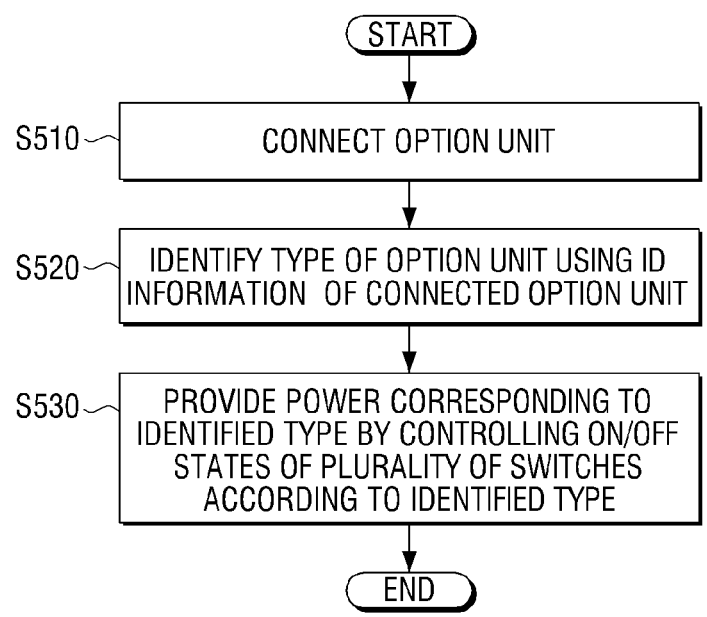
FIG. 5 is a flow chart provided to explain a method for using an option unit according to an exemplary embodiment of the present general inventive concept.

FIG. 5 is a flow chart provided to explain a method of using an option unit 115 according to an embodiment of the present general inventive concept. If an option unit 115 is connected in operation S510, the type of option unit 115 is identified based on the pre-stored ID information including the type of option unit and power allowed for each type of option unit 115 in operation S520.

On/off states of the plurality of switches located along a power supply path to supply power to the option unit 115 are controlled based on the identified type of option unit 115 so that power corresponding to the identified type of option unit 115 can be supplied in operation S530.

The option unit 115 may be connected to the image forming apparatus via the universal interface, and the plurality of switches may be located inside the universal interface.

In addition, the option unit 115 may be directly connected to the image forming apparatus 100, 300 having an adjustable connection location, and the plurality of switches may be located in the image forming apparatus. In this case, the option unit 115 may be connected to any one of the plurality of universal interfaces.

Since the method of using an option unit 115 according to an embodiment of the present general inventive concept uses the ID information of option unit 115, there is no need for a separate circuit structure to identify current or voltage required for the option unit 115. Therefore, user convenience may be enhanced by implementing a relatively simple circuit structure.

In addition, possible damage to the image forming apparatus due to inappropriate connection between the option unit 115 and the image forming apparatus may be prevented. Furthermore, the option unit 115 may be connected to the universal interface regardless of the type of option unit 115, and thus user convenience may be enhanced.

Figure 6:
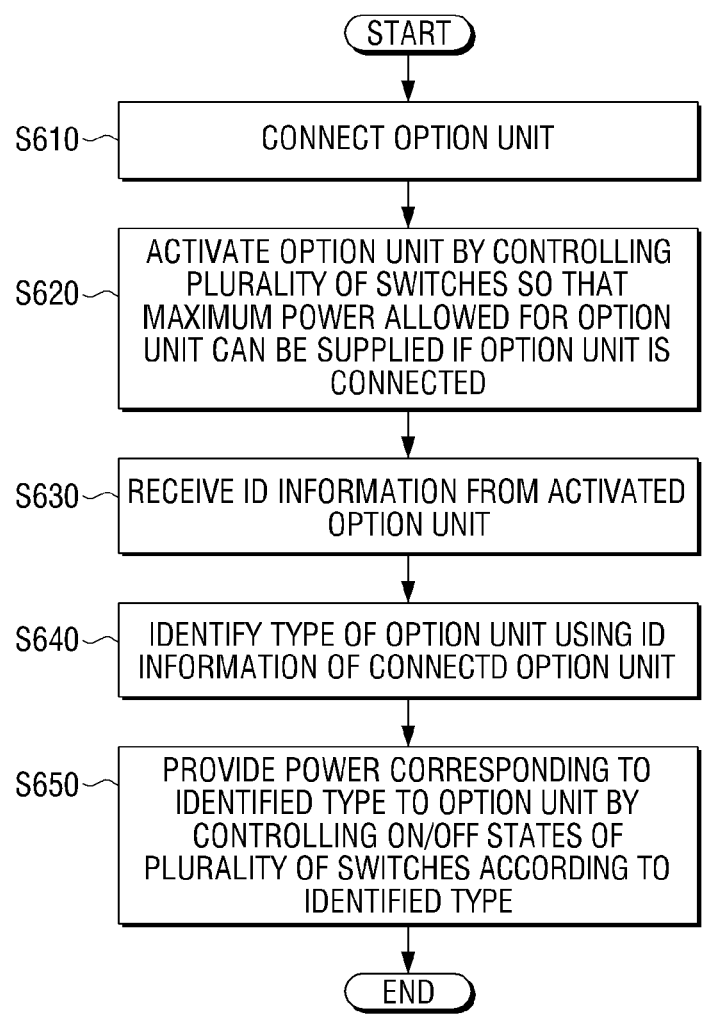
FIG. 6 and FIG. 7 are flow charts provided to explain a method for using an option unit according to another exemplary embodiment of the present general inventive concept

FIG. 6 is a flow chart provided to explain a method of using an option unit 115 according to an embodiment of the present general inventive concept. If an option unit 115 is connected in operation S610, the option unit 115 is activated and a plurality of switches are controlled to supply the allowed maximum power to the option unit 115 in operation S620. The ID information may be received from the activated option unit 115 in operation S630, and the type of option unit 115 may be identified using the ID information of the connected option unit 115 in operation S640. According to the identified type of option unit 115, on/off states of the plurality of switches located along a power supply path to supply power to the option unit 115 may be controlled, and power corresponding to the identified type of option may be supplied to the option unit 115 in operation S650.

Figure 7:
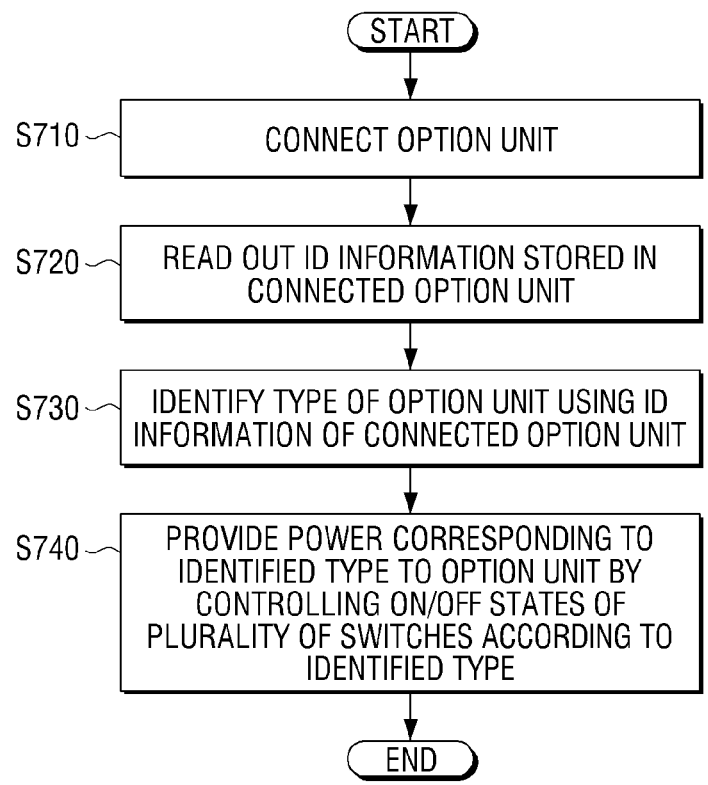

FIG. 7 is a flow chart provided to explain a method of using an option unit 115 according to an embodiment of the present general inventive concept. If an option unit 115 is connected in operation S710, the ID information stored in the connected option unit 115 is read in operation S720, and the type of the connected option unit 115 is identified using the ID information of the option unit 115 in operation S730. According to the identified type of option unit 115, on/off states of the plurality of switches located along a power supply path to supply power to the option unit 115 are controlled, and power corresponding to the identified type of option may be supplied to the option unit 115 in operation S740.

The part of the method for using an option unit 115 is similar to the explanation in the above description regarding the image forming apparatus 100, 300 and the universal interface 400.

Figure 8A:
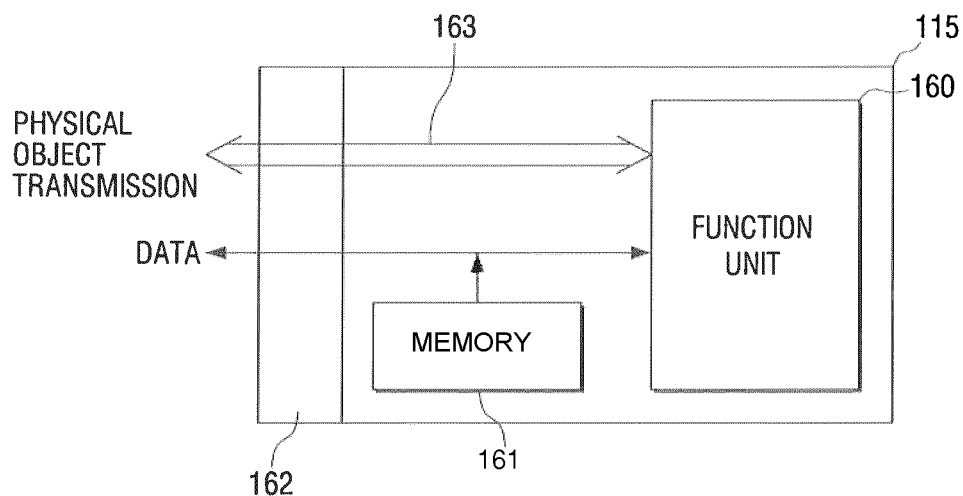
FIGS. 8A and 8B illustrate an option unit according to an embodiment of the present general inventive concept.
Figure 8B:
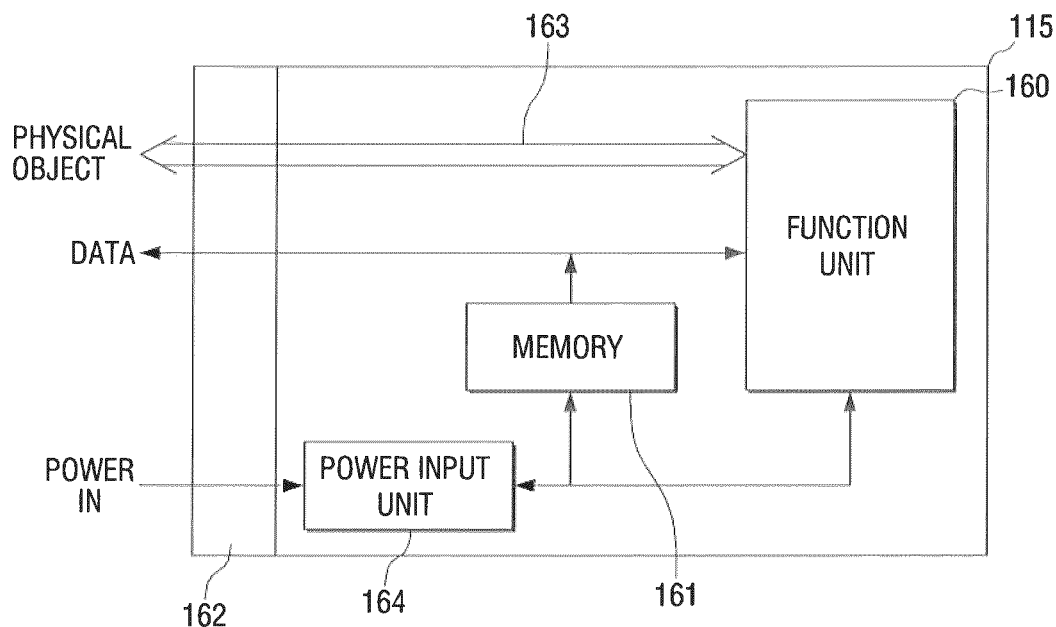

FIGS. 8A and 8B are block diagrams illustrating components of option units 115. Referring to FIG. 8A, an option unit 115 may have a connector 162 to connect to a universal interface 110, a function unit 160 to perform a specific function of the option unit 115, and memory 161 to store ID information of the option unit 115. A physical object transmission pathway 163 may be provided to transmit a physical object, such as a sheet of paper, from a universal interface 110 or an image forming apparatus 100, 300 to the option unit 115. The physical object transmission pathway may include a conduit or vessel, gears, rollers, or other mechanisms to move the physical object.

For example, the function unit 160 of the option unit 115 may sort, staple, clip, or punch a sheet of paper. The paper may be transmitted to the function unit 160 via the physical object transmission pathway 163 to be stapled. The paper may then be transmitted via the physical object transmission pathway 163 back to the image forming apparatus 100, 300, to another option unit 115, or may be stored in a storage portion of the option unit 115.

The option unit 115 may communicate with the universal interface 110 or the image forming apparatus 100, 300 via a data line. The data line may be a physical wire, a wireless data transmission device, or any other means to transmit data. When the option unit 115 is connected to the image forming device 100, 300, a control unit 140 of the image forming device 100, 300 may transmit commands to the function unit 160 of the option unit 115 via the data line.

The memory 161 may store the ID information of the option unit 115. The memory may include a combination of resistors, capacitors, inductors, transistors, or memory chips. For example, a simple memory device 161 may include one or more resistors or capacitors connected to an inductor having no direct physical contact with the universal interface 110 or the image forming device 100, 300. Alternatively, the memory 161 may be electrically connected to the universal interface 110 or the image forming device 100, 300 via a wire. The memory 161 may include data to operate the option unit 115, or the memory may be used exclusively to provide ID information and/or power information about the option unit 115 to the control unit 140.

The connector 162 may include one or more physical connections and electrical connections.

FIG. 8B illustrates an option unit 115 similar to that of 8A, but further including a power input unit 164 to receive a power signal from one of the universal interface 110 and the image forming apparatus 100, 300. The power input unit 164 may include a voltage, current, or power regulator, fuses, or other protection devices. For example, if the image forming apparatus 100 or the universal interface 110 transmits a power signal to the option unit 115 that is higher than the option unit's 115 capacity or operational specifications, the option unit 115 may adjust the power level to a manageable level or protect the option unit 115 components by opening a fuse, for example.

Figure 9A:
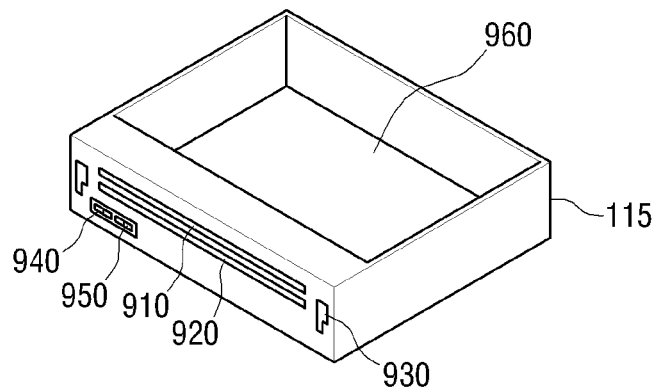
FIGS. 9A-9D illustrate physical structures of option units according to embodiments of the present general inventive concept.

FIGS. 9A-9D illustrate physical features of option units 115 according to embodiments of the present general inventive concept. FIG. 9A illustrates an option unit 115 including a physical object input port 910, a physical object output port 920, a mounting mechanism 930, power line connectors or ports 940, data line connectors or ports 950, and a physical object storage area 960.

The option unit 115 may be physically mounted to the universal interface 110 via the mounting mechanism 930, which may include hooks, cavities, magnets, latches, or any other mechanism to physically connect two devices.

The option unit 115 may include a physical object input port 910 to receive a physical object from either the image forming apparatus 100, 300 or the universal interface 110. The option unit 115 may also include a physical object output port 920 to output a physical object to the image forming apparatus 100, 300, the universal interface 110, or to another option unit 115. While the physical object ports 910, 920 are shown on a mounting surface, the ports 910, 920 may be located on any surface of the option unit. For example, in FIG. 9B, a physical object transmission port 925 is located on an upper surface of the option unit 115 to transmit or receive a physical object from an adjacent option unit 115, for example. While FIG. 9A illustrates an option unit 115 having two physical object transmission ports 910, 920, the option unit 115 may have only one port, or it may have more than two ports.

Option unit 115 may also include one or more power line connectors 940 and one or more data line connectors 950. The connectors 940, 950 may include pins, wires, cables, cords, or other electricity-transmitting media. The connectors 940, 950 may be separated or they may be integrated in a single cable connection or port. The option unit 115 may also include a physical object storage area 960 to store a physical object prior to or after performing the function of the option unit 115.

For example, if the option unit 115 is a paper sorter connected to a multi-function image forming device 100, 300, the option unit may be mounted to a universal interface 110 of the multi-function image forming device 100, 300 via the mounting mechanism 930. The power line connector 940 and the data line connector 950 may connect to corresponding connectors of the universal interface 110. The image forming device 100, 300 or the universal interface 110 may perform a function to obtain ID information and/or power information from the option unit 115. For example, the image forming device 100, 300 may supply a maximum power signal to the option unit 115 via the power line connector 940. Upon receiving power, the option unit 115 may output ID information via the data line connector 950, and the image forming apparatus 100, 300 may adjust the power output to the option unit 115 accordingly, such as by reducing a power level output to the option unit 115.

The image forming apparatus 100, 300 may further identify the function of the option unit 115 and output a sheet of paper to physical object input port 910 of the option unit 115 via the universal interface 110. Upon sorting the paper, the option unit 115 may either store the paper in the physical object storage area 960 or transmit the paper to the universal interface 110 or another option unit 115 via the physical object output port 920. If the paper sorting option unit 115 is detached from the universal interface 110, another option unit 115 having either the same function or another function may be connected to the same universal interface 110.

Figure 9B:
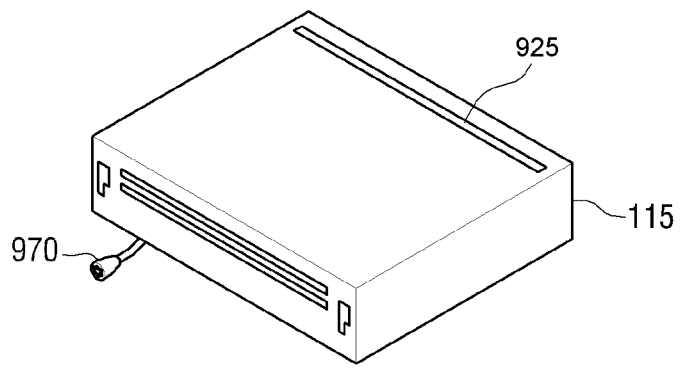

FIG. 9B is similar to 9A, except the option unit 115 of FIG. 9B includes a physical object transmission port 925 located on an upper surface of the option unit 115 to transmit or receive a physical object from an adjacent option unit 115, and the power line connector 940 and the data line connector 950 are located on a cable 970 instead of integral with a mounting surface of the option unit 115.

Figure 9C:
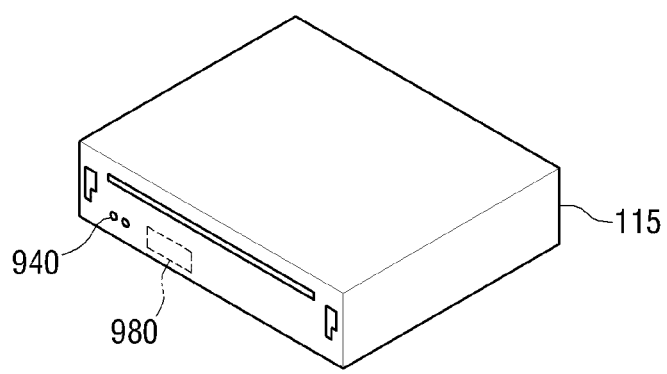

FIG. 9C illustrates a mounting surface of an option unit that wirelessly transmits data to and/or from the image forming apparatus 100, 300 or the universal interface 110. The mounting surface may include a sensor area 980 to interact with the universal interface 110 or the image forming apparatus 100, 300. The sensor area 980 may include an IR transmitter/receiver, an RF transmitter/receiver, or any other means to wirelessly transmit electrical signals from the option unit 115 to the universal interface 110 or the image forming apparatus 100, 300. For example, each of the universal interface 110 and the option unit 115 may include coils located in proximity to one another. A current may be applied to the coil of the universal interface 110 to generate a current in the coil of the option unit 115, which may power a memory device such as a capacitor, resistor, or other memory unit to output ID information.

Figure 9D:
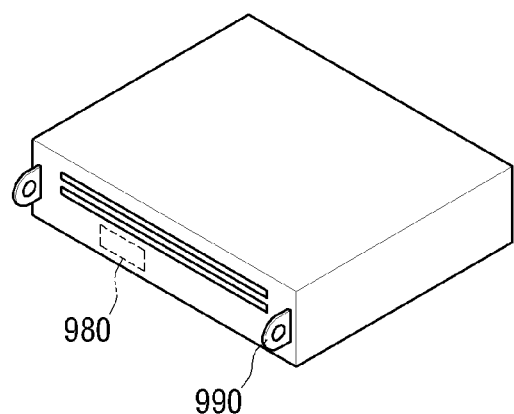

FIG. 9D illustrates an option unit 115 having no physical electrical connections between the option unit 115 and either the image forming apparatus 100, 300 or the universal interface 110. For example, the option unit 115 may include mechanical connectors 990 to connect to the universal interface 110. The mechanical connectors 990 may include gears, switches, bearings, or other mechanical devices. The universal interface 110 may drive the functions of the option unit 115 may manipulating the mechanical connectors 990. The universal interface 110 or the image forming apparatus 100, 300 may determine the ID information of the option unit 115 via a sensor area 980, such as that described with respect to FIG. 9C, above.

Figure 10A:
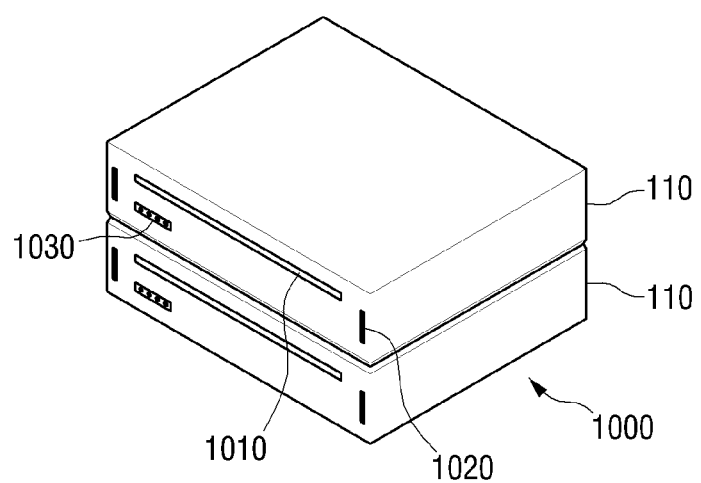
FIGS. 10A-10C illustrate physical structures of universal interface modules according to embodiments of the present general inventive concept.
Figure 10B:
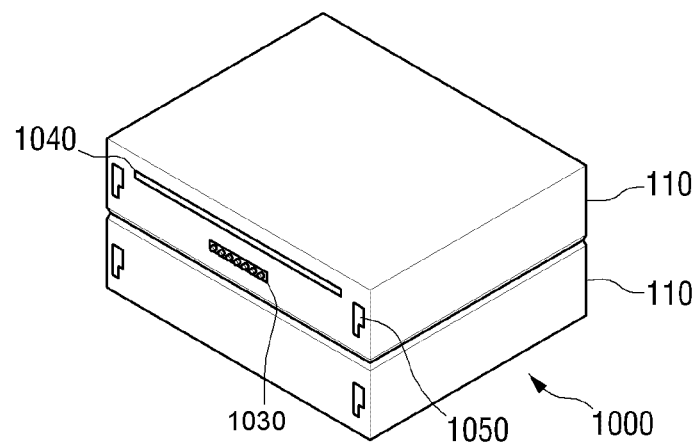
Figure 10C:
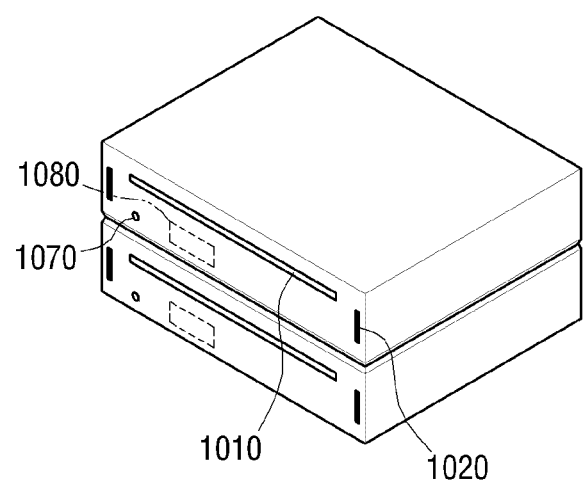

FIGS. 10A-10C illustrate physical features of a universal interface module 1000 having multiple universal interfaces 110. A universal interface 110 may include a first physical object transmission port 1010 to transmit a physical object to or from an option unit 115, a mounting part 1020, and a signal transfer area 1030. The first physical object transmission port 1010 may transmit a physical object, such as paper, to an option unit 115 to have a function of the option unit 115 performed on the physical object, and may receive the physical object from an option unit 115 via the same transmission port 1010 or via another port 1010. The mounting part 1020 is similar to the mounting mechanism 930 of FIG. 9A, and is configured to connect to the mounting mechanism 930 of an option unit 115 to mount the option unit 115 to the universal interface 110.

The signal transfer area 1030 may include power connectors or ports, data connectors or ports, or any combination of signal connectors to communicate with an option unit 115. As shown in FIG. 10A, the mounting surfaces of the universal interfaces 110 may be identical, so that various option units 115 having identical mounting surfaces may mount to each mounting face of the universal interface 110. Alternatively, the universal interface module 1000 may include two or more different universal interfaces, each corresponding to one or more different option units 115.

FIG. 10B illustrates a side of the universal interface module 1000 to mount to a surface of the image forming apparatus 100, 300. This side of the universal interface module 1000 may include a second physical object transmission port 1040, mounting mechanisms 1050, and a signal transfer area 1030. The mounting mechanisms 1050 and signal transfer area 1030 are similar to the mounting mechanism 930 and signal transfer area 1030 discussed above. This surface of the universal interface module 1000 may include only one physical object transmission port 1040 to receive a physical object from an image forming apparatus 100, 300. The universal interface module may then direct the physical object to a respective option unit 115 as directed by the control unit 140, 340. Alternatively, this surface of the universal interface module 1000 may include a physical object transmission port 1040 corresponding to each individual universal interface 110.

FIG. 10C illustrates a surface of the universal interface module 1000 to receive an option unit 115 similar to that of FIG. 10A, except the signal transfer area 1030 is replaced by only a power line 1070 and a sensor area 1080. The sensor area 1080 may be configured to correspond with and communicate with the sensor area 980 discussed above with respect to FIG. 9C.

The universal interface module 1000 may be a stand-alone device that can be connected to or disconnected from an image forming apparatus 100, 300, or it may be integral with the image forming apparatus 100, 300. When the universal interface module 1000 is integral with the image forming apparatus 100, 300, a user may only see the output ports of the module. In addition, the module 1000 may not have input ports as shown in FIG. 10A. Instead, the internal components of the universal interface module 1000 may be incorporated with internal components of the imaging apparatus 100, 300. For example, instead of having mounting mechanisms 1050 and a second physical object transmission port 1040, the universal interface module would be integrated with the imaging apparatus 100, 300, and a physical object may be transmitted from within the imaging apparatus 100, 300 directly to a connected option unit 115 via the first physical object transmission port 1010.

Figure 11:
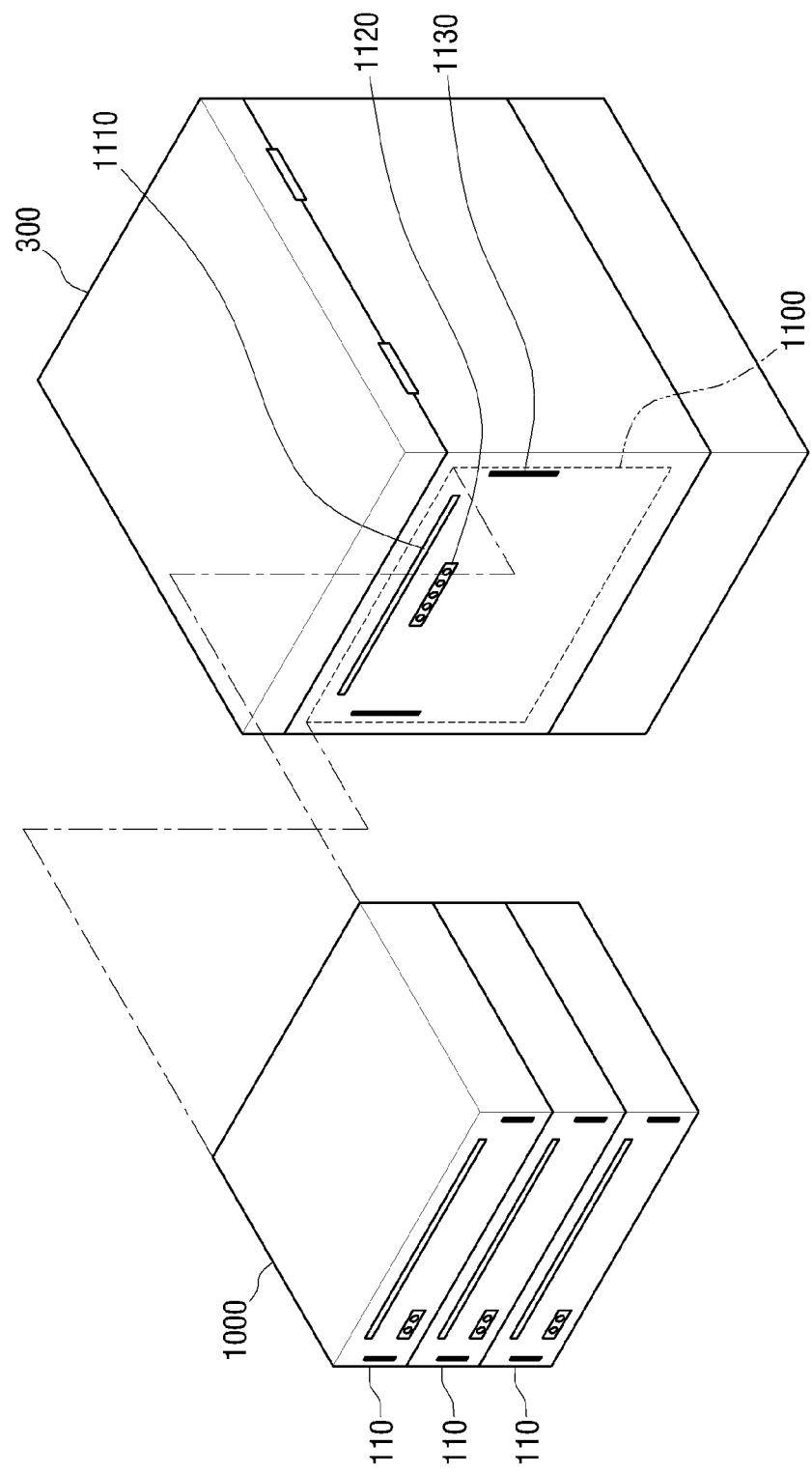
FIG. 11 illustrates a universal interface module together with an imaging apparatus.

FIG. 11 illustrates one type of universal interface module 1000 to connect to an imaging unit 300. The universal interface module 1000 has a plurality of universal interfaces 110, each having connectors to connect to an option unit 115. However, the imaging apparatus has only one interface mounting portion 1100. The interface mounting portion may include a physical object transmission port 1110, an electrical connection port 1120, and a mounting mechanism 1130, for example. Examples of these ports have been described previously with respect to FIGS. 9A-10C. The imaging apparatus may be configured so that the physical object transmission port 1110 outputs a physical object, such as a sheet of paper, to a tray when no universal interface module 1000 is connected.

The configuration shown in FIG. 11 reduces the number of ports necessary on the imaging apparatus 300 to connect to a plurality of option units 115. However, the imaging apparatus 300 may have additional ports 1110, 1120 and connecting mechanisms 1130 as desired.

FIGS. 9A-11 provide examples of structures of an imaging apparatus 300, a universal interface module 1000, and option units 115 and do not limit the universal interface module 1000, the imaging apparatus 100, 300, or the option unit 115 of the present general inventive concept to the particular physical structures shown. These apparatuses may have any desired structure, any number of ports and mechanisms, and any shape, as desired. For example, the option unit 115 and the universal interface module 1000 may be irregularly shaped or rounded. They may have more power or data transmission ports, or they may have ports and mechanisms on various surfaces to connect to other option units, other universal interface modules 1000, other imaging apparatuses 100, 300 or any other desired devices. The apparatuses 100, 300, 1000, and 115 may contain additional hardware and/or electronics to perform additional functions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
a universal interface to connect to at least one type of option unit;
a power supply unit;
a plurality of switches along a power supply path between the option unit and the power supply unit; and
a control unit to identify a type of option unit using identification (ID) information pre-stored in a memory of the option unit, the ID information including the type of option unit and an allowed power level of the type of option unit, the control unit to control on/off states of the plurality of switches to supply power to the option unit corresponding to the identified type of option unit,
wherein the control unit activates the option unit by controlling the plurality of switches to supply to the option unit maximum power when the option unit is connected to the universal interface and identifies the type of the option unit after receiving the ID information from the activated option unit and adjusts on/off states of the plurality of switches to supply to the option unit power corresponding to the identified type of option unit.

2. The image forming device of claim 1, wherein the control unit reads ID information stored in the option unit connected to the universal interface to identify the type of option unit.

3. The image forming device of claim 1, wherein the universal interface includes a plurality of universal interfaces, and when the image forming apparatus is turned on while option units are connected to each of the plurality of universal interfaces, the control unit controls the power supply unit and the plurality of switches to supply power to each of the plurality of universal interfaces, respectively.

4. The image forming apparatus of claim 1, wherein the ID information including the type of option unit includes a serial number of the option unit.

5. A method of using an option unit, comprising:
connecting the option unit to an imaging apparatus;
identifying a type of the option unit using identification (ID) information pre-stored in a memory of the option unit, the ID information including the type of the option unit and a power level allowed of the type of option unit; and
controlling on/off states of a plurality of switches located along a power supply path to supply power to the option unit according to the identified type of the option unit,
wherein identifying the type of the option unit includes activating the option unit by controlling the plurality of switches to supply a maximum power level to the option unit if the option unit is connected, and
receiving ID information from the activated option unit.

6. The method of using an option unit of claim 5, wherein the option unit is connected to the image forming apparatus via a universal interface, and
the plurality of switches are located inside the universal interface.

7. The method of using an option unit of claim 5, wherein the plurality of switches are located in the imaging apparatus.

8. The method of using an option unit of claim 5, wherein identifying the type of the option unit includes reading ID information stored in the connected option unit.

9. An imaging system, comprising:
an imaging apparatus;
a universal interface module connected to the imaging apparatus and connectable to a plurality of types of option units; and
an option unit of a first type connected to the universal interface to perform a function different than an imaging function of the imaging apparatus,
wherein the imaging apparatus includes a plurality of switches to control a power level output to the option unit,
the imaging apparatus includes a controller to control the on/off states of the switches,
the controller obtains identification information pre-stored in a memory of the option unit to identify both a type of the connected option unit and a power level to be supplied to the connected option unit, and
the controller activates the connected option unit by controlling the plurality of switches to supply to the connected option unit maximum power when the connected option unit is connected to the universal interface and identifies the type of the connected option unit after receiving the identification information from the connected option unit and controls the on/off states of the plurality of switches to supply to the connected option unit power corresponding to the identified type of connected option unit.

10. A method to connect an option unit to an imaging apparatus, the method comprising:
- connecting a universal interface module to an imaging apparatus, the universal interface module configured to receive an option unit of a plurality of types of option units;
- connecting a first option unit to a first universal interface of the universal interface module to connect the first option unit to the imaging apparatus;
- controlling a plurality of switches location along a power supply path to supply to the connected first option unit maximum power when the connected first option unit is connected to the universal interface;
- receiving identification information pre-stored in a memory of the connected first option unit from the connected first option unit, the identification information including a type of the connected first option unit and power level information to operate the connected first option unit;
- identifying the type of the connected first option unit after receiving the identification information from the connected first option unit; and
- controlling on/off states of the plurality of switches located along the power supply path to supply power to the first option unit according to the identified type of the connected first option unit.

11. An image forming apparatus comprising:
- a power supply unit to supply power to the image forming apparatus and to a plurality of option units of differing types connected to the image forming apparatus;
- a universal interface to provide a common interface to the plurality of option units;
- a plurality of switches disposed between the power supply unit and the universal interface; and
- a control unit to identify a particular type of option unit from among the plurality of option units connected to the image forming apparatus using identification (ID) information including the type of option unit and an allowed power level of the type of option unit pre-stored in a memory of each of the plurality of option units and to control on/off states of the plurality of switches so that a level of power corresponding to the identified type of option unit is provided to the identified type of option unit such that the control unit activates the option unit by controlling the plurality of switches to supply to the option unit maximum power when the option unit is connected to the universal interface and identifies the type of the option unit after receiving the ID information from the activated option unit and adjusts on/off states of the plurality of switches to supply to the option unit power corresponding to the identified type of option unit.

* * * * *